350-96.24 SR
XR 3,716,699
SEARCH ROOM

United Sta
Eckert, Jr. et al.
SUBSTITUTE FOR MISSING XR
[11] 3,716,699
[45] Feb. 13, 1973

[54] METHOD AND APPARATUS FOR OPTICAL CODE READING

[75] Inventors: Alton B. Eckert, Jr., Norwalk, Howell A. Jones, Jr., Fairfield, both of Conn.

[73] Assignee: Pitney-Bowes, Inc., Stamford, Conn.

[22] Filed: April 2, 1971

[21] Appl. No.: 130,638

[52] U.S. Cl. ........................235/61.11 E, 250/219 D
[51] Int. Cl. ........................G06k 7/10, E04g 17/00
[58] Field of Search ................235/61.12 R, 61.11 E; 250/219 R, 219 CR, 219 D; 340/146.3 K, 146.3 F; 178/17 D

[56] References Cited

UNITED STATES PATENTS

| | | | |
|---|---|---|---|
| 3,324,285 | 6/1967 | Teager | 235/61.11 E |
| 3,335,287 | 8/1967 | Hargens | 235/61.11 E |
| 3,359,405 | 12/1967 | Sundblad | 235/61.11 E |
| 3,417,234 | 12/1968 | Sundblad | 235/61.11 E |
| 3,610,891 | 10/1971 | Raciazek | 235/61.11 E |

*Primary Examiner*—Daryl W. Cook
*Attorney*—William D. Soltow, Jr., Albert W. Scribner, Martin D. Wittstein, Jr. and Louis A. Tirelli

[57] ABSTRACT

Reading of a binary printed code consisting of width-coded elements is described. Radiation from a scanning spot is directed at a pair of photo-detectors which are responsive to radiation from concentric areas of the scanning spot. The signals from the photo-detectors are used to produce an analog comparison output representative of the difference between the amount of radiation incident upon the respective detectors. The scanning spot size is selected in view of the width of the code elements so that, during a scan of the reader, narrow code elements are identified by a single excursion, and wide code elements are indicated by a double excursion in the comparison output. Logic circuitry is provided to recognize the single and double excursions in the comparison output, and provide output signals representative of the binary code.

13 Claims, 8 Drawing Figures

*INVENTORS*
ALTON B. ECKERT, JR.
HOWELL A. JONES, JR.
BY
Albert W. Scribner
ATTORNEY

*INVENTORS*
ALTON B. ECKERT, JR.
HOWELL A. JONES, JR.
*BY* Albert W. Scribner
*ATTORNEY*

INVENTORS
ALTON B. ECKERT, JR.
HOWELL A. JONES, JR.
BY
Albert W. Scribner
ATTORNEY INVENTORS
ALTON B. ECKERT, JR.
HOWELL A. JONES, JR.
BY Albert W. Scribner
ATTORNEY

METHOD AND APPARATUS FOR OPTICAL CODE READING

FIELD OF THE INVENTION

This invention relates to an apparatus and method for optically reading a binary bar code. More specifically, it relates to a binary code reader which may be manually moved to scan width-coded elements on sales tags, merchandise labels and the like for rapid and automatic processing of data such as is generated for sale computation or inventory control purposes.

BACKGROUND

Such apparatus is particularly useful in connection with equipment known as point-of-sale systems, with which a retailer may conveniently automate the sale of his merchandise. For example, in recent years electronic equipment has been developed which enables a cash register operator to enter merchandise-identifying data into a data processing system. The data processing system may utilize the data for inventory control and for updating of information as to store sales performance, as well as for cash register control to provide rapid service to the customer in computing his total charge.

A critical step in point-of-sale systems resides in the entry of merchandise-identifying data into the equipment. Manual key-punching of such data is not only laborious, but is also subject to frequent error and consumes too much time at the cash register. Accordingly, point-of-sale equipment relies upon pre-printed machine-readable codes for identifying the merchandise. The code may be printed on a tag attached to the merchandise or placed on its label, and may identify the merchandise, its price and other information such as size, wholesaler, etc.

In one known type of point-of-sale equipment, a tag is provided with a detachable segment having a merchandise-identifying code in the form of a plurality of machine-readable punched holes. The segment is separated from the tag by a cash register operator who must insert the tag segments into the point-of-sale equipment for data entry.

In another known point-of-sale system, the merchandise tag is imprinted with colored bars which are uniquely coded to identify the merchandise. A hand-held optical scanner is employed to read the bar code for data entry. This coding scheme demands extremely exact tolerances in the equipment used for printing the color code. As a result, such printing equipment is prohibitively expensive.

THE INVENTION AND THE PRIOR ART

In a binary code reader according to this invention, a code formed of elements whose widths identify a binary digit, is scanned with radiation sensors. The sensor output signals are compared in an analog sense, to produce an electrical output with excursions relative to a cross-over level which uniquely correspond in a quantitative, i.e., digital, sense to the scanned code elements. The binary code reader of this invention provides a single excursion for a narrow code element, and two excursions for a wide code element.

The binary code reader of this invention is incorporated in a scanner which may be manually drawn across the printed binary code. An advantage of this reader resides in the fact that precise control of the scanning velocity, which is difficult to accomplish manually, is not required.

An important element in a point-of-sale system is the printing device employed to record the binary code on tags, labels and the like. A variable width binary code, such as is used with the reader of this invention, is preferably formed of elements including (a) rectangular marks or bars arranged parallel with one another, and (b) the spaces separating those marks or bars. The marks and/or spaces are width-coded in a binary fashion as narrow or wide elements to represent "ones" or "zeroes," or vice versa. In this code the tolerances demanded with respect to element width, edge demarcation, and ink density are much reduced, thus permitting the use of a much simpler and far less expensive code printing device.

In a preferred embodiment of this reader, a hand-held optical scanner of the general type seen in Sundblad U.S. Pat. Nos. 3,359,405 and 3,417,234 scans a spot the width of which is a predetermined amount greater than the width of a narrow code element, but small enough to fit within a wide element. The tolerances are such that parallax due to different angular orientations of the scanner may make the scanning spot effective area vary within certain limits relative to the binary coded character elements, but without affecting reliable detection of the binary code.

The wide code elements are substantially larger than the narrow code elements by an amount which assures a double excursion signal response from a wide element, and a single excursion signal response from a narrow element. This is achieved by employing a pair of photo-detectors which respond to respective concentric portions of the scanning spot. The photo-detectors produce electrical signals representative of their respective incident light levels, and these signals are compared in order to produce an analog output representative of the difference between the signals. Concentric scanning geometry and extraction of an analog difference output have been employed before, as in U.S. Pat. No. 3,427,462 of Cist, but not for the purpose of reading a digital data code.

In the present invention the analog comparison output is characterized with respect to a cross-over level which equals the level achieved when the scanning spot is located over a generally uniform portion of the code-printed surface. Thus, as the reader is moved across the binary code pattern, the analog comparison output reaches the cross-over level whenever the edge of a code element bisects the scanning spot, and whenever the scanning spot is within a wide code element (black or white). Bisecting of the scanning spot by a code element edge (as the scanning spot enters the element) causes the analog comparison output to cross the cross-over level and subsequently to rise toward a peak. If the code element is a wide one, the comparison output first attains the peak and then reduces again to the cross-over level as the scanning spot comes entirely within the wide code element. Then as the scanning spot emerges at the trailing edge of the wide code element, the comparison output first rises to a second excursion above the cross-over level and then descends again to the cross-over level as the scanning spot is bisected by the trailing edge.

The narrow code element is smaller in width than the scanning spot, and cannot fully contain the scanning spot. Therefore the narrow code element is represented in the comparison output by only a single excursion between two crossings of the cross-over level (representing bisecting of the scanning spot by the leading and trailing edges of the code element respectively).

Logic circuitry is provided to count the number of excursions in the comparison output between each two successive crossings of the cross-over level. This logic circuitry employs a reference-generating circuit which sets a threshold level for the detection of the excursions.

The single and double excursion signals generated by the binary code reader of this invention permit discrimination of the wide and narrow code elements independently of the velocity of the scan. This renders the binary code reader of this invention ideally suited for manual scanning.

Relatively large scanning spots may be employed, since the actual widths of the printed code elements are not measured. Such a large scanning spot enhances the integrating effect of the optical system, advantageously reducing sensitivity to printing variations such as voids within printed areas, and also providing substantial automatic compensation for background variations on the code-printed surface.

The binary reader of this invention also permits particularly efficient utilization of the code. For example, the white spaces between black marks may be width-coded, as are the marks themselves. The analog comparison output distinguishes between marks and spaces by providing reverse excursions for spaces, e.g., excursions on the opposite side of the cross-over level. Narrow and wide spaces are characterized respectively by single and double excursions on one side of the cross-over level, while narrow and wide marks are characterized respectively by single and double excursions the other side of the cross-over level.

DETAILED DESCRIPTION OF THE PREFERRED EMBODIMENTS

Figure 1:
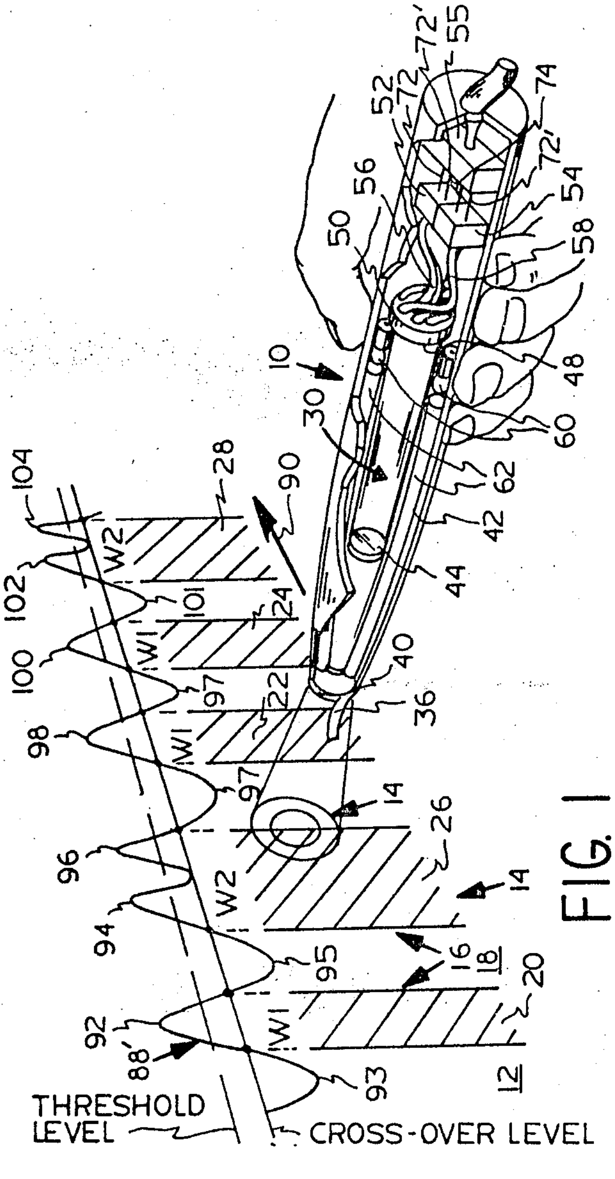
FIG. 1 is a perspective broken view of a binary code reader in accordance with the invention, shown in conjunction with a binary code-printed surface and a signal waveform derived from scanning the code.

With reference to FIG. 1, a hand-scanned binary code reader 10 in accordance with the invention is shown in reading position over a normally white or light-colored surface 12 imprinted with a binary code generally indicated at 14. The binary code 14 is formed of width-coded marks 16 which are separated by uniform spacings 18. The marks 16 are preferably formed by inked rubber type elements, and include narrow bars such as 20, 22 and 24 of width W1, and wide bars such as 26 and 28 of a larger width W2.

The binary code reader 10 includes an optical system 30 having a viewing axis 32 shown directed generally transversely to the code-carrying surface 12. The optical system 30 is axially mounted in a bore 42 of a generally cylindrical housing 34 sized and shaped to be easily held by a person for manual scanning across the binary code 14, in the direction of arrow 90. One or more light sources 60 illuminates fiber optic bundles or other light conductors 62 which spread out to a cylindrical distribution about an objective aperture 40, to train a cone of light upon the bar code 14. This light is then reflected back from the code 14 through aperture 40 to the optical system 30. A spacer 36 extends beyond the end of the housing 34 conveniently to locate the optical system 30 at a given focal distance from the bar code 14 during a scan.

Figure 2:
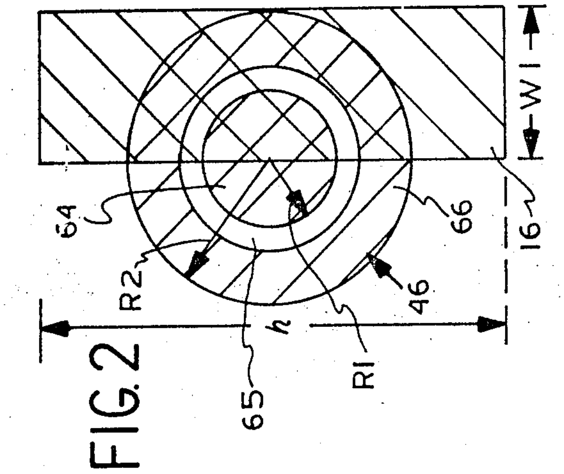
FIG. 2 is an enlarged schematic view of a narrow code element on which is superimposed a scanning spot employed by the binary code reader shown in FIG. 1.

The optical system includes a lens 44 which focuses light reflected from a scanning spot 46 (i.e. the area "-seen" by the optical system) onto an image surface 48. Any one of a wide variety of techniques may be used to divide the image surface 48 into distinct scanning areas. In the particular example illustrated, the image surface is formed by the ends of light conductors such as optical fibers 50. The light conductors are arranged to make the image surface 48 circular, and to conduct imaged light to a pair of photo-detectors 52 and 54. The outputs from these photo-detectors are coupled to a circuit 55 (illustrated in greater detail by FIG. 3). The light conductors 50 are divided into two bundles 56 and 58 to apportion the amount of light emanating from scan spot 46 between the photo-detectors 52 and 54. The amount of light reflected by surface 12 and incident upon photo-detectors 52 and 54 will vary in accordance with the binary code, white spaces 18 reflecting substantially more light than the dark inked marks 16. A central circular core of light conductors 56 delivers image light to photo-detector 52, and a concentric outer ring of light conductors 58 conveys image light to photo-detector 54. In effect, the scanning spot 46 is divided into an inner circular area 64 and an outer annular area 66, as illustrated in FIG. 2.

The annular area 66 is sized so that its diameter 2R2 is larger than the width W1 of a narrow code element such as mark 20 of FIG. 1. Thus, during scanning only a portion of the scanning spot 46 will fit within a narrow code bar, while the remaining portion is located in a space 18, to produce a single signal excursion 92 as will be further described with reference to FIGS. 1 and 3. The size of scanning spot 46 is determined by the size of the image surface 48, the focal length of lens 44, and the distance between the end of housing 34 and surface 12 (as set by spacer 36). For the preferred embodiment of the binary code reader 10, the inner circular region 64 and outer annular region 66 are equal in area, concentric, and separated by an annular dead space 65.

Figures 3, 8:
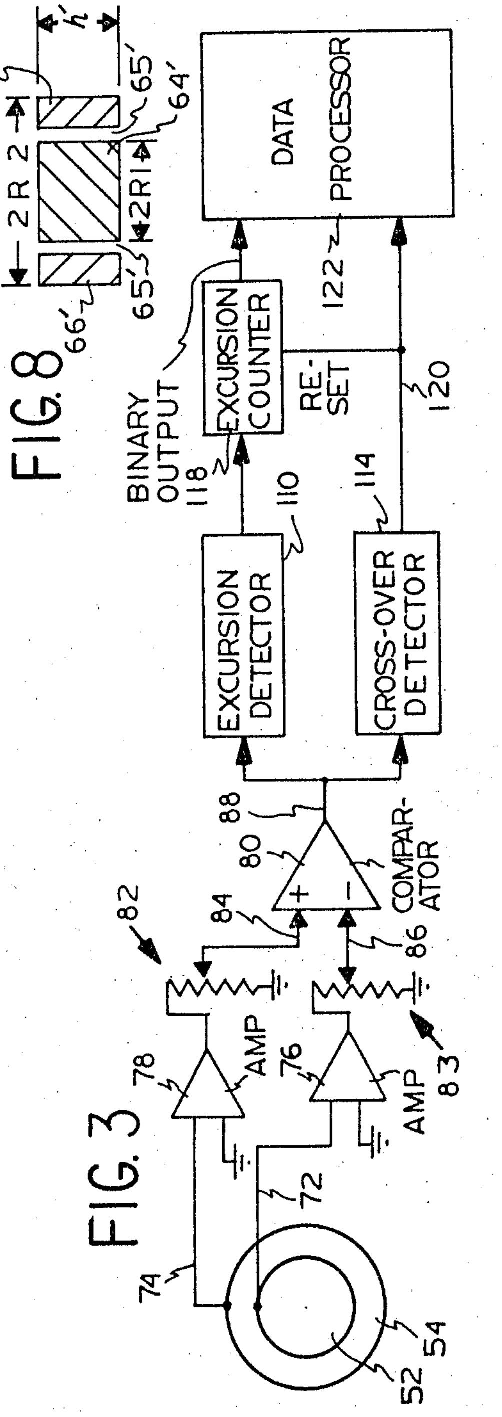
FIG. 3 is a schematic block diagram of the reader for a binary code consisting of spaced, width-coded marks, and logic circuitry for detecting excursions in the comparison output generated by the reader.
FIG. 8 is an illustration of an alternative scanning spot geometry for use with the reader of this invention.

The circuitry 55, which is employed to discriminate between the narrow and wide code elements, is schematically illustrated in FIG. 3 wherein the photo-detectors 52 and 54 are, for clarity of illustration, shown as though they were similar in size, shape and concentricity to their respective inner and outer areas of scanning spot 46. These photo-detectors are electrically connected by leads 72 and 74 to a pair of amplifiers 76 and 78 respectively. Thus, the signal on lead 72 represents the amount of light within the inner scan area 64, and the signal on lead 74 represents the amount of light within the outer scan area 66.

The outputs of amplifiers 76 and 78 are coupled respectively through voltage-divider networks or other conventional level adjustment circuits 82 and 83 to the non-inverting input 84 and inverting input 86 of a differential amplifier, here referred to as an analog comparator 80. The output 88 of the comparator 80 (with due allowance for the scale factor introduced by voltage dividers 82 and 83) represents the net radiation signal after the radiation incident on inner scan area 64 is subtracted from the radiation incident on the outer scan area 66.

For the preferred embodiment, the voltage dividers 82 and 83 are adjusted so that the comparator output 88 registers a cross-over level of zero volts when the scanning spot 46 is located over a region of surface 12 from which the light emanates in a uniformly or symmetrically divided manner. In other words, when the scanning spot is entirely within a space 18 or a mark 16, then the comparison output is at the cross-over level. And when the scanning spot 46 is symmetrically divided by an edge of a mark 16 (as seen in FIG. 2), the comparison output is also at the cross-over level. During a scan of the binary code pattern 14 in the direction of arrow 90 in FIG. 1, an analog comparison output is produced as illustrated by the waveform 88′ in FIG. 1.

The comparison waveform of FIG. 1 is characterized by excursions such as 92–104 which occur as the scanning spot 46 passes over the narrow and wide code marks 20, 26, 22, and 24 respectively. Positive excursions 92, 94, 96, 98, 100, 102, and 104 occur on one side of the cross-over level, while negative excursions such as 93, 95, 97, 99 and 101 (which correspond to spaces 18) occur on the other side of the cross-over level. Furthermore, for reasons explained in detail below, each narrow code mark 20, 22 and 24 is represented by a single excursion 92, 96 or 98 respectively, while the wide code marks 26 and 28 are indicated by pairs of excursions 94, 96 and 100, 102 respectively. Note that each such pair 94, 96 or 102, 104 is "consecutive" in the sense that they are not separated by a positive-going crossing of the cross-over level.

Recognition of the excursions in the comparator output 88 is accomplished by an excursion-detecting network 110 connected to output 88 of comparator 80 as shown in FIG. 3. The Excursion-detector 110 recognizes when the comparison signal has an excursion about a threshold level. A cross-over detection network 114 is also coupled to the output 88 of comparator 80, and generates an output pulse whenever the comparison signal crosses the cross-over level. The excursion-detector 110 and cross-over detector 114 may both be conventional Schmitt trigger circuits which are set to change their output states at input voltages equal to the threshold and cross-over levels respectively.

An excursion counter 118 is coupled to the excursion detector 110 to determine the number of excursions which occur between crossings of the cross-over level. Whenever the cross-over detector 114 recognizes a positive-going crossing, the excursion counter is reset by a pulse on the output line 120. Hence, a count of one excursion in counter 118 identifies a narrow code element 20, 22, or 24, while a count of two "consecutive" excursions signifies a wide code element 26 or 28. A data processor 122 coupled to the counter 118 and the output 120 of a cross-over detector 114 may then utilize the binary information in the counter for decoding the information contained in the bar code 14.

Figure 4:
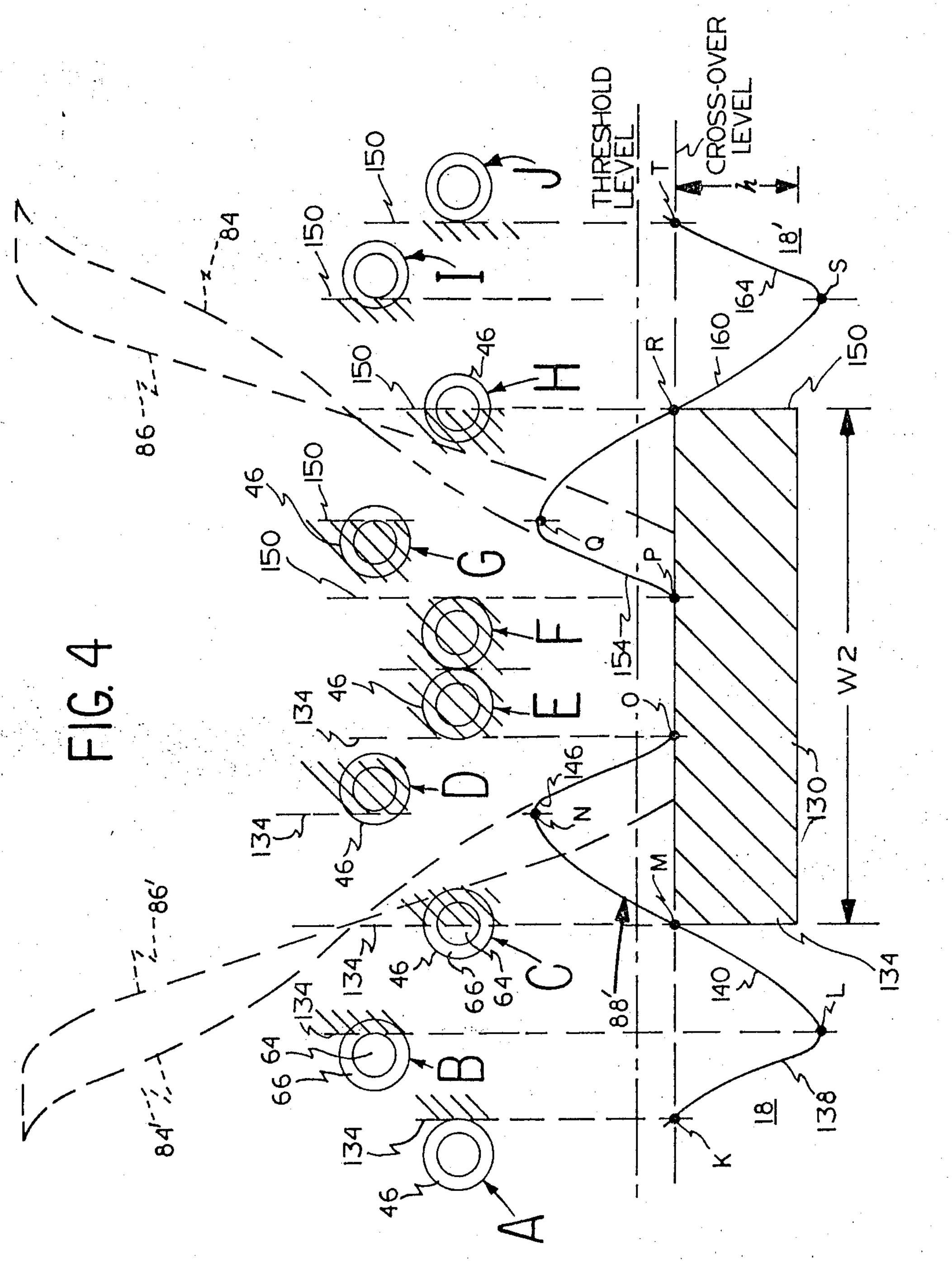
FIG. 4 is an enlarged schematic view of a wide code element, with a signal waveform and a series of position diagrams superimposed thereon to illustrate the various positions of the scanning spot relative to the code element while developing a double excursion comparison output.

The double and single excursion distinction between the narrow and wide code elements offers a unique advantage in the binary code reader of this invention. Detection of the code is virtually independent of the scanning speed employed. This may be appreciated from the following explanation of the development of the double excursion waveform for a wide code element. In FIG. 4 a wide code element 130 of width W2 is shown on an enlarged scale, while reference characters A–J indicate the scanning spot 46 at several positions relative to the leading and trailing edges of the code element 130. The signal at input 84 to the comparator 80 in FIG. 3, representing the amount of light from the outer scan area 66, is indicated by the dashed line 84′. The signal at input 86 of comparator 80 in FIG. 3, representing the amount of light from the inner scan area 64, is indicated by dashed line 86′. The difference between signals 84′ and 86′, the comparison output 88, is represented by curve 88′. All three waveforms 84′, 86′ and 88′ are correlated point-for-point with the code element 130 in FIG. 4.

Initially, when the scanning spot 46 is at the far left end of the mark 130, as indicated at A, and just about to touch leading edge 134, the comparator output 88′ is zero volts (point K on the curve) because signals 84′ and 86′ are equal. As soon as the scanning spot 46 enters marks 130 the comparison output 88′ drops below the cross-over level (slope 138), since signal 84′, representing the amount of light emanating from annular scan area 66, is reduced by the effect of the non-reflective mark 130. When the leading edge 134 of the mark 130 is tangential to the inner scan area 64, as shown at B, a negative peak (point L) of the comparator output 88′ is reached. Further movement of the scanning spot 46 onto mark 130 is accompanied by an upward slope 140 of the comparator output 88′.

Continued passage of scanning spot 46 over mark 130 brings the leading edge 134 to a position, indicated at C, in which the scanning spot 46 is effectively bisected thereby. This even division of the scanning spot results in equal irradiation of the photodetectors 52 and 54, thus producing another crossing by the comparator output 88′ of the cross-over level (point M). When the scanning spot 46 reaches the position indicated at E, the entire inner scan area 64 is within the mark 130 and a small portion of the outer scan area 66 is within the more reflective space 18. Hence, the comparator output 88′ has reached a first positive peak level at point N. Afterwards the comparator output 88′ reduces to its cross-over or zero volt level (point O) when the entire scanning spot 46 is located within the mark 130 as shown at E.

The comparison output 88′ stays at the cross-over level until point P, when the scanning spot 46 begins to emerge from the trailing edge 150 of the mark 130 as shown at F. Then the outer scan area 66 first protrudes into space 18′, causing curve 88′ to begin a rise 154 to a second positive peak at point Q which occurs when the scanning spot 46 is at the location illustrated at G. The comparator output 88′ then returns (slope 160), reaching the cross-over level at point R when trailing edge 150 bisects the scanning spot 46 as indicated at H. The portion of the comparator output 88′ formed after leaving the trailing edge 150 is a mirror image of the waveform developed in approaching the leading edge 134. Thus a negative peak S is generated when the scanning spot 46 at the location indicated at I, and after upward slope 164 the cross-over level is reached again at point T when the entire scanning spot 46 is within space 18′ as indicated at J.

An analysis of waveform generation for a narrow code element would be similar in all respects to FIG. 4, except that compression in the horizontal direction would bring waveform points N through Q into coincidence, deleting the inter-peak dwell region between N and Q resulting in a single-peak output waveform.

The versatility of the binary code reader of this invention may be especially appreciated when one considers the tolerances required of the widths W2 and W1 (FIGS. 1 and 2) of the wide and narrow code elements respectively. The wide code elements should be preferably at least as wide as the maximum diameter 2R2 (FIG. 2) of the scanning spot 46. This assures a double peak response in the manner described with respect to FIG. 4. In a low noise environment, however, an effectively detectable double peak may be generated even at smaller widths, as long as the width is greater than about 90 percent of the maximum diameter 2R2 of the scanning spot. It is desirable, however, that the wide code elements be wide enough to enable the comparison output 88′ (FIG. 4) to dip below the threshold level for more reliable separation of peaks N vs. Q. Since there is no maximum width W2 for a wide element, its width may be any dimension wider than the scanning spot 46, subject only to the limits imposed by printing-space requirements. Any excess width only widens the time gap between the twin peaks N and Q.

The width W1 of a narrow code element, however, should not be so great as to generate two peaks. Furthermore, the minimum width of the narrow element should be large enough to assure a single peak of sufficient amplitude to permit detection. If the nominal width W1 of a narrow code element is selected equal to the maximum radius R2 (FIG. 2) of the scanning spot, then its maximum width should be generally no greater than about 80 percent of the diameter 2R2 in FIG. 2, and its minimum width should be at least about 20 percent of the maximum diameter 2R2 of FIG. 2.

The height of both wide and narrow code elements should be at least great enough to give practical assurance that manual scanning will not cause the reader to run "off the track" vertically. Greater heights, however, will not adversely affect the decoding operation.

The minimum width for the uniform white spaces 18 which separate the code bars 16 is about the same as for the narrow code bars. The only requirement is that a well-defined negative excursion be developed between the code bars, for adequate separation. Larger spaces 18 will not adversely affect decoding, but will extend the time scale of the output waveform 88′. Therefore, when a single-coded format of the type seen in FIG. 1 is used, i.e., width-coded bars separated by non-coded spaces, or width-coded spaces separated by non-coded bars, it is preferable to make the non-coded elements of minimum practicable width for the sake of maximum information density.

Within these described general limits for the printed code, a great amount of flexibility is provided in the design of the code bar printer, and this is one of the principal advantages of the present approach, compared to the prior art color code approach which requires extremely close tolerance printing.

The circular boundaries of scanning spot areas 64, 66 are chosen merely for the sake of convenience in designing the optical system 30. So far as decoding is concerned, that circular shape could be replaced by some other; for example, as seen in FIG. 8, a rectangular inner area 64 of width 2R1 flanked on both sides by rectangular areas 66′ whose overall span is 2R2, the height $h'$ of the rectangular areas 64′ and 66′ being equal to each other and not greater than the height of the code bars 16. Thus, circular concentricity is not essential, but only the leading and lagging relationship of the outer area 66 or 66′ to the inner area 64 or 64′ which results either from the concentric circular geometry of FIG. 2 or from flanking geometries such as the rectangular one of FIG. 8.

From the preceding remark, it will be understood that it is the spatial separation, by which regions 66 or 66′ lead or lag the central regions 64 or 64′ respectively, that results in a single or double peak analog comparison output. Experimental results indicate that an improvement in performance is obtained by providing additional separation in the form of "dead space" 65 between areas 64 and 66, or similar dead spaces 65′ between areas 64′ and 66′. The desired dead space is preferably obtained by masking an appropriate area or areas of the image surface 48.

With the alternative logic circuitry 200 illustrated in FIG. 5, the analog comparator output 88 may represent both coded spaces 18 and coded marks 16, which are detected as follows. A pair of Schmitt trigger excursion detectors STD and STN are responsive to the analog comparator output 88. Detector STN detects negative excursions (i.e., those below the cross-over level) and detector STP detects positive excursions (those above the cross-over level). With reference to the analog comparator output waveform 88″ appearing on lead 88 in FIG. 5 and the correlated waveform timing diagrams of FIG. 6, the detector STN produces a positive-going output pulse starting each time the waveform 88'' drops below the negative "on" level in FIG. 6 and terminating when the waveform 88'' returns to the negative "off" level in FIG. 6. Positive detector STP produces an output pulse starting each time the waveform 88'' exceeds the positive "on" level and terminating when the waveform returns to the positive "off" level. Schmitt triggers STP and STN correspond to the excursion detector 110 of FIG. 3, for positive and negative excursions respectively.

The output of peak detector STP is coupled to the reset input R of a set-reset flip-flop, and the output of the negative detector STN is coupled to the set input S of the same flip-flop 222. Both flip-flow inputs are triggered on the rising edges of their input pulses. Both the negative and positive detector outputs are coupled to circuit OR1. The falling edge of the output of OR1 drives the clock input CK of a D flip-flop. The Q output of that flop is connected to a gate &0 which passes the binary zero output pulses, and the $\bar{Q}$ output is connected to a gate &1 which passes the binary one output pulses, both at sampling times determined by the outputs of a gate OR2.

The latter gate responds to a pair of one-shot circuits OSN, which operates for negative excursions, and OSP, which operates for positive excursions, of the analog waveform 88''. Circuit OSN is triggered by the falling edge of the RS flip-flop Q output, and circuit OSP by the falling edge of the $\bar{Q}$ output. Another one-shot circuit OSC drives the clear input C of the D flip-flop whenever circuits OSN or OSP drive OR2.

The RS flip-flop, one-shot circuits OSN, OSP and OSC, and gate OR2 together correspond to the cross-over detector 114 of FIG. 3. The D flip-flop corresponds to the excursion counter 118 of FIG. 3, and is a scale-of-two device for distinguishing single and double excursions. In effect, the RS flip-flop changes state each time the analog comparison output 88'' crosses the cross-over level, and then resets the excursion counter (D flip-flop).

Binary output pulses representing the detected wide code elements are produced by sampling the excursion counter (D flip-flop) at the time of each OR2 output, i.e., each cross-over. If the D flop is set, a binary 0 output pulse is gated out to signify a narrow code element. If not, a binary 1 pulse is gated out to signify a wide code element.

Figure 5:
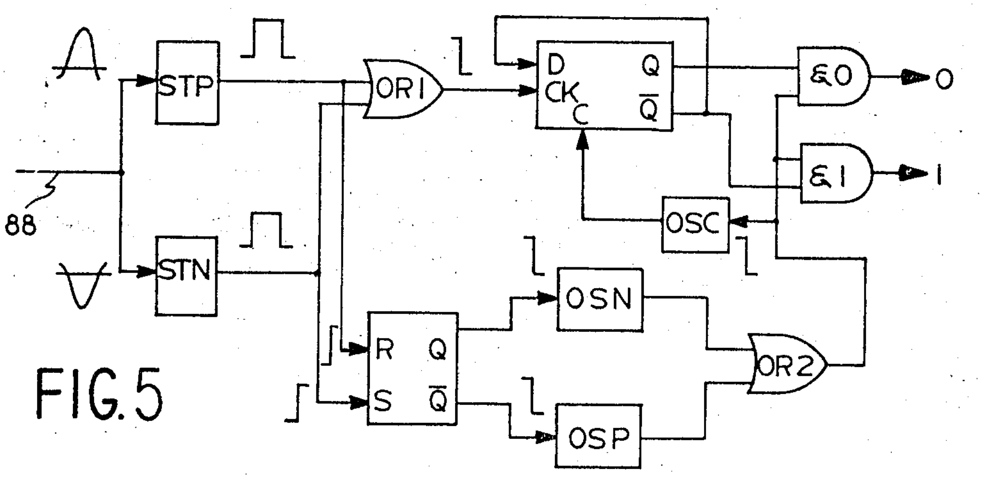
FIG. 5 is a detailed schematic block diagram of an alternative circuit employed in a binary code reader which is designed for recognizing a binary code formed of width-coded spaces interleaved with width-coded marks.
Figure 7:
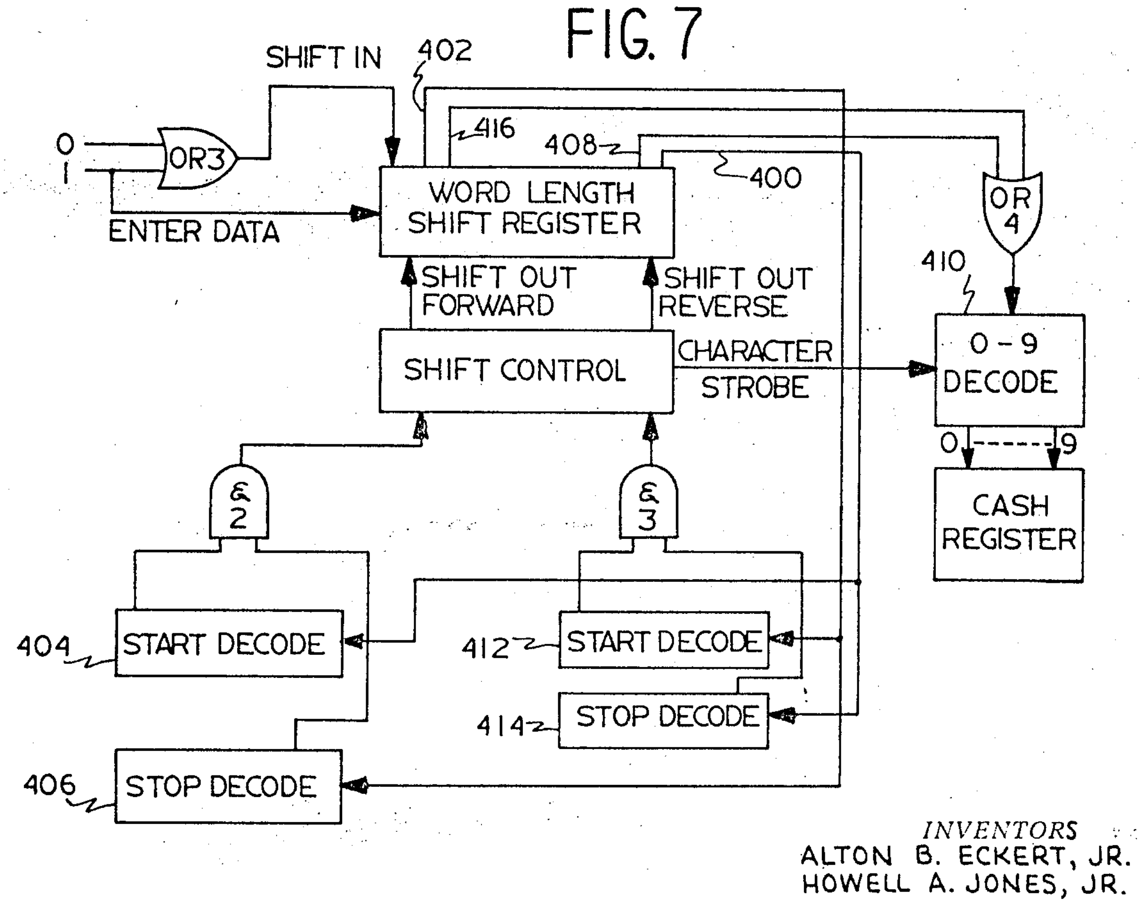
FIG. 7 is a block diagram of data processing equipment for use with the code reader circuitry of FIG. 5.
Figure 6:
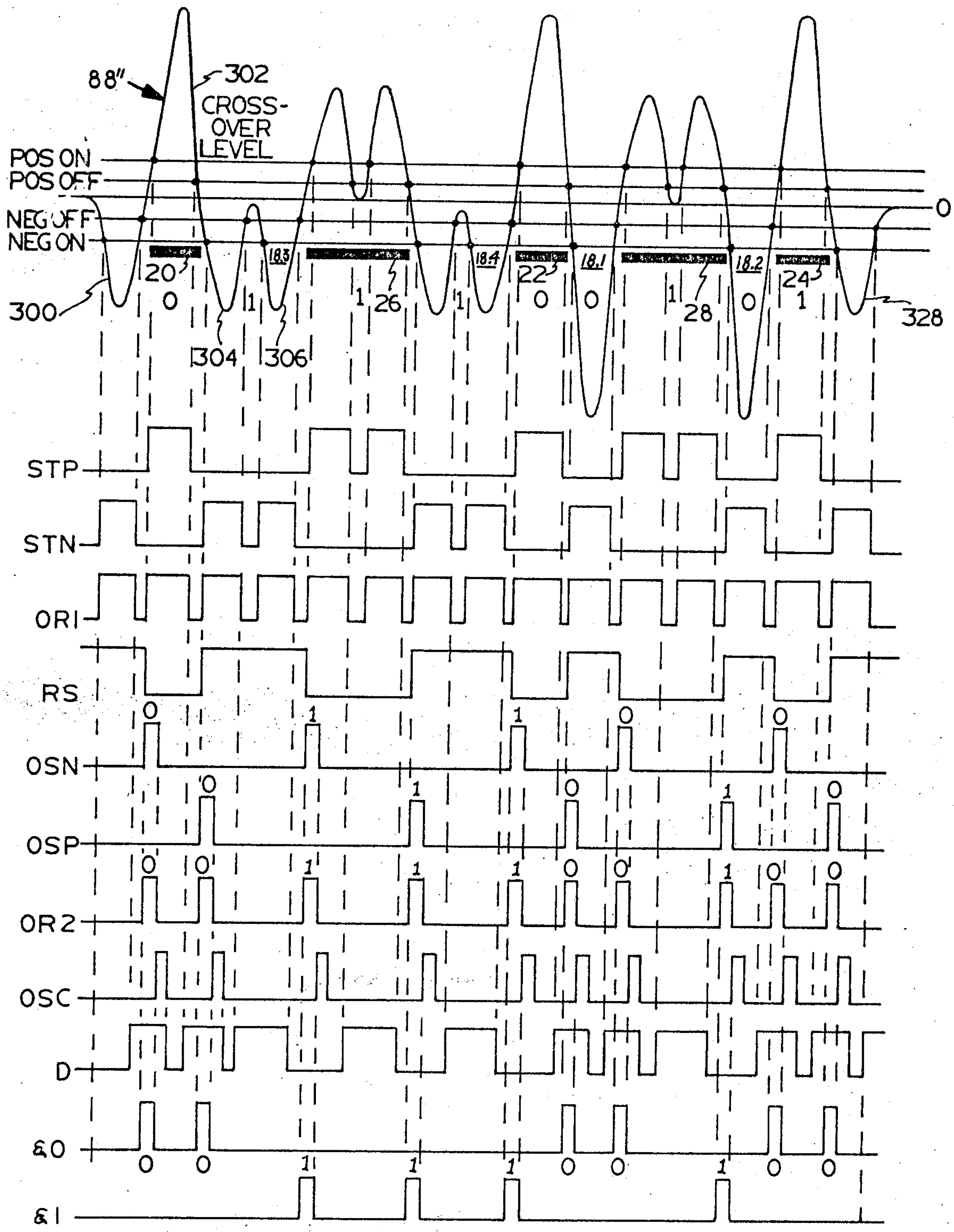
FIG. 6 displays a waveform of the comparison output generated by a binary code reader utilizing the circuitry of FIG. 5, with the corresponding binary code pattern formed of both coded marks and coded spaces superimposed thereon; plus a correlated pulse timing diagram which includes several pulse waveforms developed at various points in the circuitry of FIG. 5.

The operation of the circuitry illustrated in FIG. 5 may be particularly understood with reference to the comparison output waveform 88'' shown in FIG. 6 and developed by scanning the illustrated binary code, wherein narrow marks 20, 22 and 24 and narrow spaces 18.1 and 18.2 all signify binary zeroes, and wide marks 26 and 28 and wide spaces 18.3 and 18.4 all signify binary ones. Assume the scan is made from left to right with respect to FIG. 6, although the opposite scanning direction may also be employed. At the commencement of the scan, the comparison output 88'' initially goes through a single negative excursion 300 which is interpreted as an intercharacter pulse. After negative excursion 300, the comparison output 88'' moves towards a single positive excursion 302 which is interpreted as a zero. Then the comparison output 88'' proceeds to the first of a pair of successive negative excursions 304 and 306 which together indicate a one. Note that each OSN pulse indicates a cross-over following one or two negative excursions, and each OSP pulse indicates a cross-over following one or two positive excursions. Hence each OR2 output represents the end of a bit, whether positive or negative, one or zero, and indicates a time for sampling the excursion counter (D flop). Whenever the excursion count is one at sampling time the D flop is up (count of one excursion) indicating the bit is binary zero. When the excursion count is two, however, the D flop is down (count of two excursions) and the bit is binary one. The following excursions of waveform 88'' are interpreted in the same manner. The waveform then terminates in another intercharacter pulse 328.

In a typical double-coded document the widths of the marks and spaces employed are as follows:

| | | Tolerances |
|---|---|---|
| narrow mark | .008'' | +.004''-.002'' |
| narrow space | .010'' | +.002''-.004'' |
| wide mark | .021'' | +.004''-.002'' |
| wide space | .023'' | +.002''-.004'' |

The height of the marks is typically anywhere from ¼ inch to 1 inch or more.

FIG. 8 shows data processing equipment which utilizes the 1 and 0 outputs of FIG. 6. For simplicity, it is assumed that this circuit need recognize only a start code, stop code, and the ten decimal numerals 0 to 9 in binary coded form, which requires only five binary bits; but the technique to be described is easily extended to the entire alphanumeric character repertoire, with appropriate provision for handling larger numbers of binary bits. Each tag or label to be read by the equipment of this invention has a single message or "word" imprinted thereon in the form of black bars and intervening white spaces one or both of which may be width-coded as described above. The word comprises a predetermined number of characters, including a start character at the beginning, a stop character at the end, and data consisting of a plurality of decimal digits in between. Each character consists of five code bits represented by five coded elements on the paper. In addition, there are preferably inter-character elements to provide a one-bit spacing between characters.

The binary zeroes and ones from FIG. 5 are both coupled through a gate OR3 to advance a word length shift register one bit for each code element read. The binary ones are connected directly to the data entry input of the register. Provision is made for the possibility that a code string on the tag may have been scanned in either direction. If scanning takes place in the forward direction, then after the entire word has been shifted into the register, a data cable 400 connected to the last character cell in the register will carry the first character of the word, and that will be a start character. A data cable 402 connected to the first character cell will carry the last character, and that will be a stop character. These two characters will be decoded by circuits 404 and 406 respectively, and the coincidence of the two decoded characters enables a data gate &2 which then starts a cycle of operation of a shift control circuit. When enabled by the gate &2, the shift control circuit shifts data out of the register in a forward direction. Consequently a data cable 408, connected to the penultimate data cell in the register, conveys a string of characters, from first to last, to data date OR4.

From there it does to a decimal digit decoder 410 which decodes and relays numerical data to the cash register.

If the data were originally read and stored in the shift register in reverse order, circuits 412 and 414 would decode the start and stop characters on cables 402 and 400 respectively, and then data gate &3 would cause the shift control circuit to shift data out of the register in reverse order. Then data cable 416, connected to the second data cell of the shift register, would convey the data string to gate OR4, and on to the decimal decoder 410, and the cash register.

Each data cell in the shift register comprises six bits. The shift control circuit is a device with an internal clock which operates to shift six bits at a time in either direction, thus advancing the register one character (five bits) plus one intercharacter bit at a time. It then enables the decimal decoder 410 with a character strobe or decode instruction pulse, after which it repeats that operation until the entire word is shifted out. At that point the cycle of operation of the shift control circuit is terminated.

CONCLUSION

It will now be appreciated that this invention provides a way of hand-scanning a width-code which is independent of scanning speed, tolerates ordinary printing equipment, and employs a large enough aperture to integrate some common defects associated with ordinary print quality.

Since the foregoing description and drawings are merely illustrative, the scope of protection of the invention has been more broadly stated in the following claims; and these should be liberally interpreted so as to obtain the benefit of all equivalents to which the invention is fairly entitled.

The embodiments of the invention in which an exclusive property or privilege is claimed are defined as follows:

1. A method of reading binary coded characters including spaced narrow and wide code elements respectively representing opposite binary digits; comprising the steps of:

observing radiation from first and second areas which together are larger in width than narrow elements and smaller in width than wide elements;

scanning the observed areas jointly across the width dimension of the elements;

effectively subtracting the radiation from the first area from the radiation from the second area to generate a comparison output characterized by a cross-over level corresponding to the location of said first and second areas over a region of uniform radiation;

said first and second areas being selectively located relative to each other to provide a crossing of the cross-over level of the comparison output when the areas pass over an edge of a code element during a scan;

and counting the number of excursions in the comparison output between crossings of the cross-over level to discriminate between the narrow and wide code elements.

2. A method of reading binary coded characters as in claim 1 wherein the radiation observing step further includes:

selecting said first and second areas so that one of them brackets the other on both sides with respect to the direction of scan.

3. A method of reading binary coded characters as in claim 1 wherein the first and second areas are substantially equal.

4. A method of reading binary coded characters on a surface, said characters including narrow and wide code elements respectively representing binary digits; comprising the steps of:

scanning the binary code with a spot which is larger in width than narrow code elements and equal to or smaller in width than wide code elements so as to fit entirely within only a wide code element during a scanning traversal thereof;

apportioning radiation emanating from different areas of the scanning spot between a first radiation sensor and a second radiation sensor;

effectively subtracting signals from the radiation sensors to provide a comparison output characterized by a cross-over level which is indicative of the location of the scanning spot over a generally uniformly radiating area of the binary coded surface, and of the traversal of the scanning spot of an edge of a code element;

detecting the excursions of the comparison output past a peak threshold level during the traversal of the scanning spot over a code element;

and generating an output signal representing the number of excursions of the comparison output during the scanning spot traversal of code elements to identify the binary code.

5. A method as in claim 4 wherein said code elements include interspersed marks and spaces;

the excursion-detecting step including sensing the excursions of the comparison output past a space-related threshold level during the traversal of the scanning spot over a space element and sensing the excursions of the comparison signal past a mark-related threshold level during the traversal of the scanning spot over a mark element;

and the output signal generating step providing output signals representing both space-related excursions and mark-related excursions so as to decipher said binary code which includes said marks and spaces.

6. The method of claim 4 wherein the scanning step further includes scanning the binary code with a scanning spot selected so that the wide code element has a width in the scanning direction which is greater than about 90 percent of the width of the scanning spot in said direction and the narrow code element in said direction is less than about 80 percent of said width of the scanning spot.

7. Apparatus for reading a binary code wherein the binary code is formed of narrow and wide code elements to denote a binary digit; comprising:

means for scanning a spot across the code, said scanning spot being sized larger than the width of narrow code elements and generally smaller than the width of wide code elements;

radiation detectors oriented to respond to radiation received from the scanning spot, said radiation detectors providing first and second input signals respectively which are representative of the amount of radiation incident thereon from respective selected portions of the scanning spot;

means responsive to the first and second input signals for producing a comparison output the amplitude of which is representative of the difference between the radiation incident upon the detectors, said comparison signal being characterized by a cross-over level corresponding to the location of the scanning spot over a generally uniformly radiating region of the binary coded surface or over an edge of a code element;

and means responsive to the comparison output for detecting excursions thereof past a predetermined threshold level to produce output signals representative of the binary code.

8. The apparatus of claim 7 wherein the means for detecting excursions of the comparison output further includes:

means for detecting crossings by the comparison output of said cross-over level and producing signals indicative thereof;

means for detecting excursions in the comparison output when said output exceeds the predetermined threshold level, and producing signals indicative thereof;

and means controlled by the cross-over-indicating signals and responsive to the excursion-indicating signals for determining the number of excursions between successive cross-overs and producing a first binary output signal indicative of the occurrence of a single excursion between successive cross-overs and a second binary output signal representing the occurrence of a pair of excursions between successive cross-overs.

9. A scanner for detecting a binary code formed of narrow and wide code elements, the width of said elements representing binary bits; comprising:

means for effectively comparing radiation energy emitted from selected first and second scan areas which are selectively sized with respect to a direction of scan to fit within a wide code element and not within a narrow code element, and producing a comparison output representative of the difference between the radiated energies from said first and second scan areas which comparison output is characterized by excursions with respect to a cross-over level as the elements and the comparing means are moved relative to one another; said cross-over level corresponding to the location of both said first and second scan areas over a uniform energy radiating portion of the surface or over an edge of a code element;

means for detecting equality between said cross-over level and said comparison output;

and means for determining the number of excursions of the comparison output past a selected threshold level between successive crossings of the cross-over level by the comparison output to produce a binary output signal indicative of the binary code.

10. Apparatus for detecting binary coded legends including wide and narrow detectable segments whose widths identify the binary code; comprising:

means for selecting a first scan area, said first scan area having a generally predetermined size with respect to the narrow and wide segments of the binary coded legend;

means for producing a first signal representative of radiation energy emanating from the selected first scan area;

means for selecting a second scan area on said surface, said second scan area having a predetermined size with respect to the first scan area and being at a pre-selected location relative to said first scan area, means for producing a second signal representative of radiation energy emanating from the second scan area;

means responsive to said first and second signals for producing a comparison output representative of the difference between the radiation energy emanating from the selected first and second scan areas, said comparison-output with respect to a cross-over level selected to correspond with the positioning of the first and second scan areas over a region of generally uniform radiation energy or over an edge of a segment;

means responsive to the comparison output for detecting the number of excursions thereof between its crossings of said cross-over level to produce binary output signals discriminating between the wide and narrow segments of the binary coded legend.

11. A scanner for detecting binary coded characters, the width of narrow and wide elements in the code representing binary bits; said scanner comprising:

means responsive to radiation energy emanating from the binary code for effectively comparing the radiation energy emanating from selected first and second scan areas and for producing a comparison output representative of the difference between the radiation energy emanating from said first and second scan areas, said comparison output being characterized by a cross-over level corresponding to the location of the first and second scan areas over a generally uniformly distributed radiation-energy-emanating portion of the binary code so as to provide crossings by the comparison output of said cross-over level in correspondence with transitions between successively located code elements;

and means for determining the number of excursions in the comparison output between crossings of the cross-over level and for producing binary output signals representative of the binary code on the surface.

12. The scanner of claim 11 wherein the excursion-determining means further includes:

means responsive to the comparison output for producing signals indicative of when the comparison output exceeds a predetermined threshold level;

means for counting the number of excursion-indicating signals;

and means responsive to the comparison output for producing a cross-over signal when the comparison output crosses the cross-over level and applying said cross-over signal to the counting means for resetting thereof.

13. A scanner for detecting a binary code formed of narrow and wide code elements including binary coded elements including both marks and spaces distinguished from each other as to optically detectable reflectivity; comprising:

means for producing a comparison output representative of the difference in the amount of light reflected from first and second surface scan areas which are selectively sized commensurate with the width of the marks and spaced to produce a comparison output cross-over level when said first and second scan areas overlie an edge of a code element and when said first and second areas are located over a generally uniformly reflecting surface region;

means responsive to the comparison output for detecting space-related excursions thereof when said comparison output exceeds a space-related threshold level located on one side of the cross-over level;

means responsive to the comparison output for detecting mark-related excursions thereof when said comparison output exceeds a mark-related threshold level located on the other side of the cross-over level;

means responsive to signals from the mark and space excursion detectors for producing a cross-over signal indicative of the crossing by the comparison output of said cross-over level;

and means for determining the number of excursions between successive cross-over signals and producing binary output signals representative of both the binary coded marks and spaces.

* * * * *